W. A. CLARK.
Lubricator.
No. 201,332. Patented March 19, 1878.
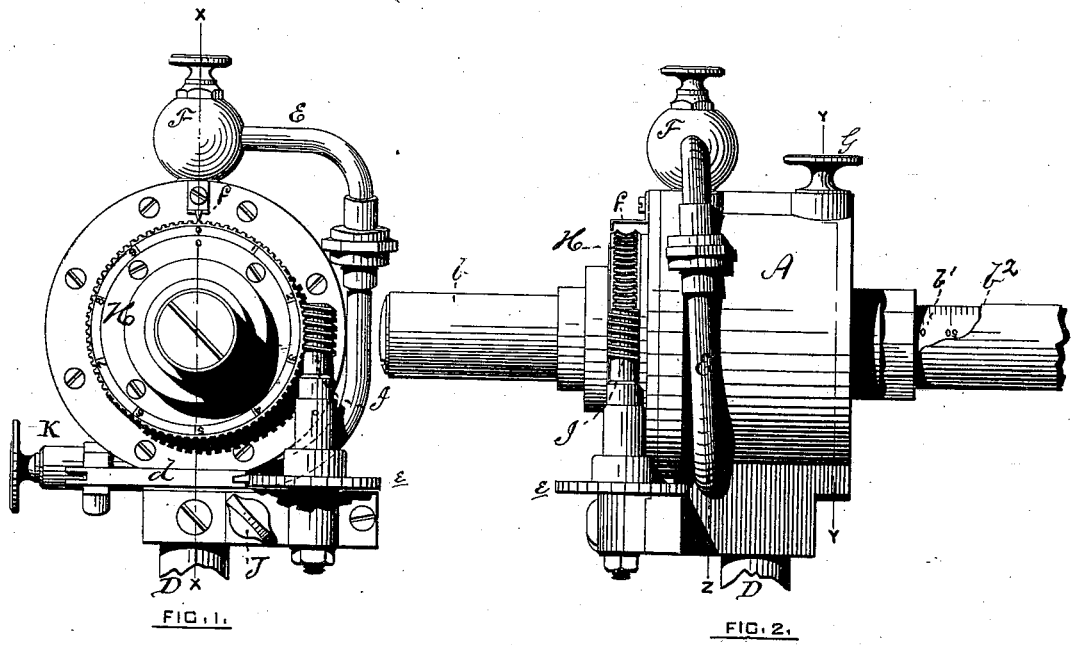
FIG. 1.   FIG. 2.
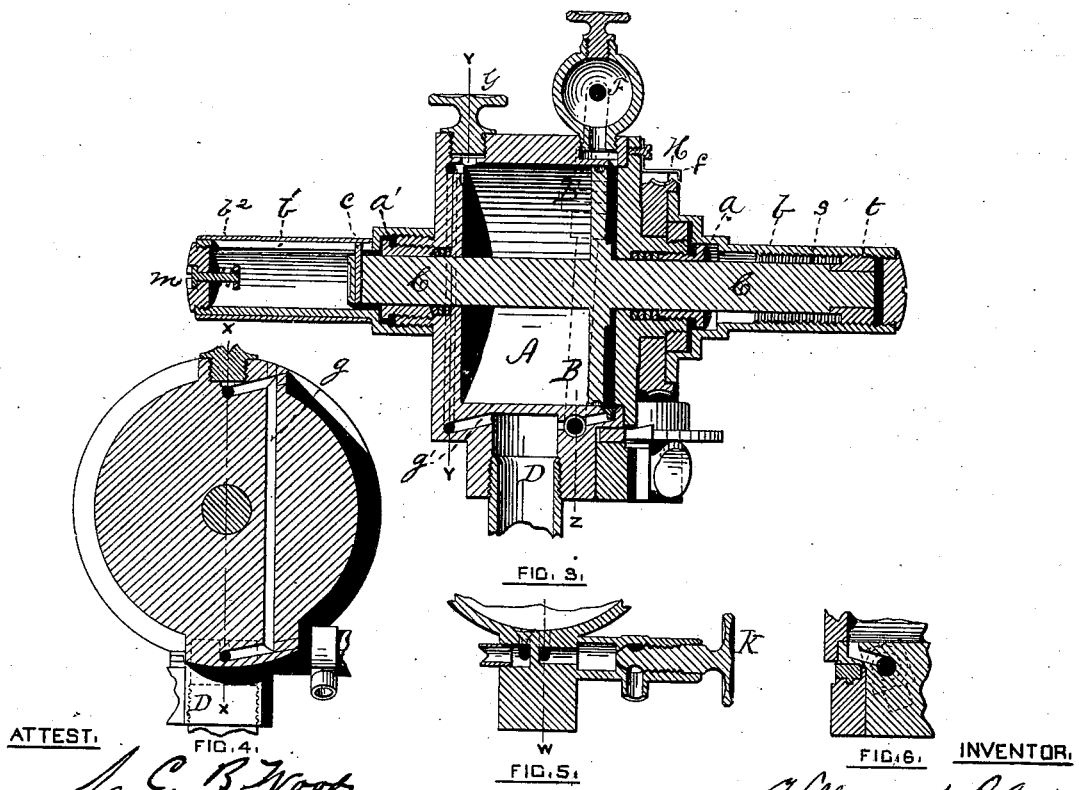
FIG. 3.
FIG. 4.   FIG. 5.   FIG. 6.
ATTEST:   INVENTOR:

UNITED STATES PATENT OFFICE.

WILLIAM A. CLARK, OF WESTVILLE, CONNECTICUT.

IMPROVEMENT IN LUBRICATORS.

Specification forming part of Letters Patent No. 201,332, dated March 19, 1878; application filed February 13, 1878.

*To all whom it may concern:*

Be it known that I, WILLIAM A. CLARK, of Westville, in the county of New Haven and State of Connecticut, have invented certain new and useful Improvements in Lubricators; and I do hereby declare that the following specification, taken in connection with the drawings making a part of the same, is a full, clear, and exact description thereof.

Figure 1 is a front view. Fig. 2 is a side view. Fig. 3 is a longitudinal section on the line $x\ x$ of Fig. 1. Fig. 4 is a vertical transverse section on the line $y\ y$ of Fig. 2. Fig. 5 is a vertical section on the line Z of Fig. 2. Fig. 6 is a vertical section on the line W of Fig. 5.

The object of my invention is to provide an apparatus which shall be applicable to a locomotive as well as to a stationary marine engine, and which can be adjusted to supply to that portion of the machine which is to be oiled—as, for example, the valves and cylinders—a prescribed quantity of oil per mile for every mile run by the locomotive, or to a stationary or marine engine a prescribed quantity for every stroke of the piston of the engine.

In the drawings, A represents a cylinder, which is furnished with a tightly-fitting piston, B, Fig. 3. The piston-rod C extends in opposite directions through both of the cylinder-heads.

The apparatus may be supposed to be mounted on one of the steam-chests of a locomotive, and is connected with the interior of the chest by the pipe D.

To enable it to work under an equilibrium of pressure, a branch pipe, E, Figs. 1 and 2, conducts live steam to the small chamber F, containing water, and connected by a suitable duct with a space on the back side of the piston. This water and its additions from condensation of the steam flowing into the chamber F balance the pressure of the steam against the oil in the cylinder A upon the opposite side of the piston.

It is to be understood that when the apparatus is first prepared for duty, the piston is to be brought to the position shown at Fig. 3, and the cylinder filled full of oil through the aperture on top, which is then to be closed by the screw-plug G. In this condition there is water upon one side of the piston and oil upon the other side, and both fluids are under equal pressure.

Upon that side of the piston which may be called the back or water side, the piston-rod extends through a stuffing-box, $a$, into a sleeve, $b$, which incases it. The interior of this sleeve is furnished with a screw-thread, $t$, and the sleeve is attached at its base to a disk-plate, H, the periphery of which is concave, and is cut with a worm-thread. When the disk is made to revolve, the sleeve so attached thereto will revolve around the piston-rod. A portion of the piston-rod is furnished with a male screw, $s$, which fits into the threads of the screw $t$ on the interior of the sleeve, and consequently when the sleeve is rotated the piston will be moved toward the opposite end of the cylinder A, provision being made to prevent the piston from turning on its own axis.

The piston-rod attached to the opposite side of the piston also passes through a stuffing-box, $a'$, in the other cylinder-head, and enters a sleeve, $b^1$, similar to sleeve $b$, with the exception that it has no screw-thread, but is furnished with a longitudinal slit, into which a pin, $c$, enters, projecting radially from the piston-rod, and which slot and pin connection prevents the piston from turning on its axis inside the cylinder when the disk H and its connecting-sleeve $b$ are revolved. The sleeve $b^1$ is inclosed within a sliding detachable sleeve, $b^2$, which covers the slot before described, and protects the piston-rod from dust and dirt, which would otherwise be liable to enter through the slot.

Upon the surface of the sleeve $b^1$ graduations are marked, each space of which may represent, for example, the distance which the piston will travel in a run of ten miles by the locomotive, or any given distance of travel of the piston if the engine is not a locomotive, and the head of the pin $c$ serves as an index to the scale. The end of the sleeve $b^1$ is furnished with a valve, $m$, for the escape of any air compressed by the piston-rod, while it prevents dirt or gravel from entering the sleeve.

In connection with the disk H there is an operative worm-screw, I, as shown at Figs. 1 and 2. This worm-screw is worked by a pawl-and-ratchet gear, $d\ e$, in a well-understood way, and a reciprocating movement is given to the lever $d$, which operates the ratchet-pawl, by connecting the same with the valve-rod or any moving member of the engine.

The face of the disk-plate H is graduated and numbered, so that each space shall indicate one or more strokes of the piston of the engine, and an overhanging index-pointer, $f$, fastened to the cylinder-head, enables the scale to be easily read. As each complete revolution of the disk-plate is indicated by the advanced position of the pointer $c$ with reference to the scale on the sleeve $b^1$, the total number of miles run or the total number of strokes made by the piston of the engine can be easily ascertained, and also from the scale on the sleeve $b^1$ the position which the piston B occupies in the cylinder, and consequently the quantity of space in the cylinder A which remains filled with oil, can be at once determined.

The operation of the piston B is to force the oil in the cylinder A through a passage or duct, $g$, into the steam-pipe D. This duct is shown at Fig. 4 as cut in the cylinder-head, and its lower end, when it enters the passage D, is trapped. The trapped end is shown in Fig. 3 at $g'$. The upper angle of the duct is elevated, as seen at Fig. 4, so that the oil will be obliged by the pressure of the piston to rise to a point higher than the body of oil in the cylinder, as otherwise there would be a discharge of oil into the engine when the locomotive was not in motion.

Instead of the plan shown in the drawing of cutting the oil-passage in the cylinder-head, it will, perhaps, be advisable to conduct the oil from the cylinder by means of a pipe which connects with the cylinder A at the top of the latter, and passes around the outside of such cylinder and enters the steam pipe or passage D. By thus carrying the pipe on the outside, it will be convenient to bend the pipe into a form which will make a U or S trap, and thus more effectually than by the arrangement shown in the drawing preventing condensed steam or air from working its way into the oil-cylinder.

After all the oil in the cylinder A has been discharged, the water which then will occupy the cylinder, but upon the back side of the piston, can be discharged by opening the draw-off cock K.

By disconnecting the worm-screw I from its worm-gear, which can be done by loosening the thumb-screw J, Fig. 1, the disk-plate H can be readily revolved in the reverse direction, and the piston B be thereby brought back to the position shown at Fig. 3.

What I claim as my invention, and desire to secure by Letters Patent, is—

1. A lubricator composed of the combination of the following elements, viz: a cylinder for containing the lubricant, and having a passage, as described, for the injection of the same into the engine, a piston fitted to said cylinder and under an equilibrium of pressure, as described, and mechanism, substantially as described, connecting the piston with a moving member of the engine, whereby the quantity of oil discharged by the movement of the piston shall be regulated and proportioned by the speed or number of revolutions made by the engine, as set forth.

2. In a lubricator, the combination, with the moving piston of an oil-injector, of a graduated disk, H, which is attached to the nut, giving movement to the piston, and is combined, as described, with a moving member of the engine, whereby the number of revolutions of the engine can be observed and the quantity of oil discharged be measured.

3. The combination, with the piston and its rod, of the slotted graduated sleeve $b^1$, within which the piston-rod moves, and the sliding sleeve or casing $b^2$, substantially as described, whereby the position of the piston and the quantity of oil discharged may be readily determined, and the piston-rod protected from abrasive matter, as set forth.

4. In a lubricator, the combination of a cylinder, A, and piston B, which latter has a movement given to it dependent upon the movement of the engine, as described, and a discharge-passage, $g$, for the oil, whose upper end is elevated to prevent the outflow of the oil by gravity, and which is provided with a trap to prevent the inflow of steam or air, substantially as described.

WILLIAM A. CLARK.

Witnesses:
J. C. B. WOOD,
THOMAS F. COSGROVE.